US010040364B2

(12) United States Patent
Nishi et al.

(10) Patent No.: US 10,040,364 B2
(45) Date of Patent: Aug. 7, 2018

(54) CHARGING APPARATUS

(71) Applicant: NICHICON CORPORATION, Kyoto (JP)

(72) Inventors: Masaya Nishi, Kameoka (JP); Shigeo Ohkuma, Kameoka (JP)

(73) Assignee: NICHICON CORPORATION, Kyoto-shi, Kyoto (JP)

( * ) Notice: Subject to any disclaimer, the term of this patent is extended or adjusted under 35 U.S.C. 154(b) by 43 days.

(21) Appl. No.: 15/337,297

(22) Filed: Oct. 28, 2016

(65) Prior Publication Data

US 2017/0217326 A1 Aug. 3, 2017

(30) Foreign Application Priority Data

Jan. 29, 2016 (JP) .................................. 2016-015535

(51) Int. Cl.
*H02J 7/00* (2006.01)
*H02J 7/14* (2006.01)
*B60L 11/18* (2006.01)

(52) U.S. Cl.
CPC ......... *B60L 11/1844* (2013.01); *B60L 11/185* (2013.01); *B60L 11/1816* (2013.01);
(Continued)

(58) Field of Classification Search
CPC ................................................ B60L 11/1844
(Continued)

(56) References Cited

U.S. PATENT DOCUMENTS 9,685,798 B2 * 6/2017 Appelbaum .......... H02J 7/0027
2011/0313603 A1 12/2011 Laberteaux et al.
(Continued)

FOREIGN PATENT DOCUMENTS

JP 2012-055028 A 3/2012

OTHER PUBLICATIONS

Partial European Search Report dated Jul. 7, 2017 in the corresponding European patent application No. 16202608.2.

*Primary Examiner* — Edward Tso
*Assistant Examiner* — Ahmed Omar
(74) *Attorney, Agent, or Firm* — United IP Counselors, LLC

(57) ABSTRACT

A charging apparatus includes a plurality of charging ports; a charging portion configured to output charge current to the charging ports; an input portion configured to receive selection of a user among a plurality of charge patterns prepared in advance including a charge-history-dependent charge pattern to determine the charge current based on charge history information regarding a charge history of the electrically-powered vehicle; a selection result storing portion configured to store a result of the selection; a history information storing portion configured to store the charge history information of the electrically-powered vehicles connected to any of the charging ports; and a controller configured to refer to the selection result storing portion, control the charging portion in accordance with a selected charge pattern, the controller configured to determine priorities of the electrically-powered vehicles based on the charge history information when the charge-history-dependent charge pattern is selected and two or more electrically-powered vehicles are connected to the charging ports.

13 Claims, 1 Drawing Sheet

(52) U.S. Cl.
CPC ....... *B60L 11/1846* (2013.01); *B60L 11/1861* (2013.01); *B60L 11/1862* (2013.01); *B60L 2230/16* (2013.01); *B60L 2240/80* (2013.01); *B60L 2250/16* (2013.01); *Y02E 60/721* (2013.01); *Y02T 10/705* (2013.01); *Y02T 10/7005* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC .......................................................... 320/109
See application file for complete search history.

(56) References Cited

U.S. PATENT DOCUMENTS

| 2012/0277927 | A1* | 11/2012 | Watkins | G06F 1/26 700/292 |
|---|---|---|---|---|
| 2014/0006137 | A1 | 1/2014 | Melen et al. | |
| 2015/0266389 | A1 | 9/2015 | Appelbaum et al. | |

* cited by examiner

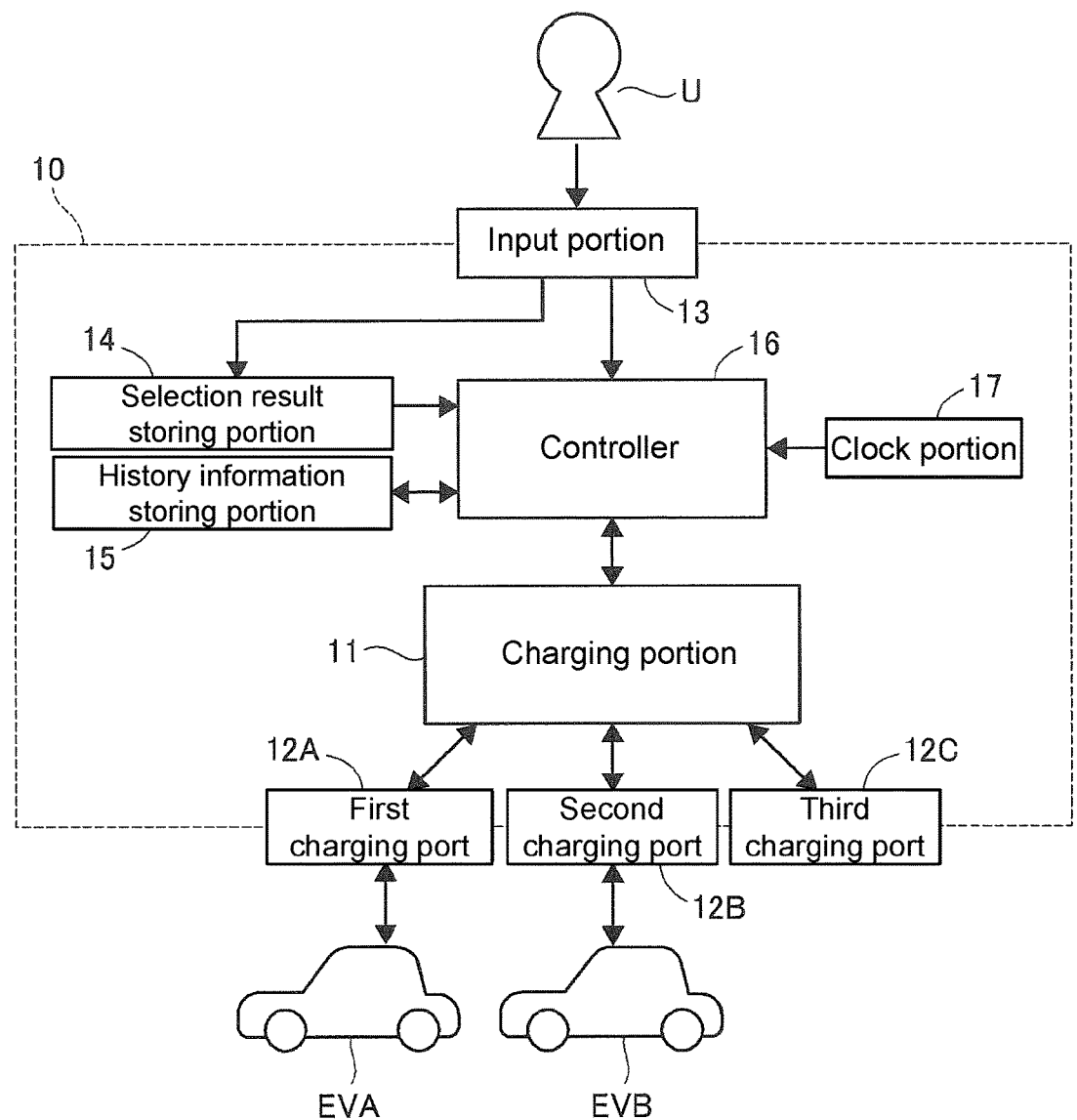

CHARGING APPARATUS

CROSS-REFERENCE TO RELATED APPLICATIONS

This application claims the benefit of priority to Japanese Patent Application No. 2016-015535, filed on Jan. 29, 2016, the entire contents of which are hereby incorporated by reference.

BACKGROUND

1. Technical Field

The present invention relates to a charging apparatus for an electrically-powered vehicle.

2. Description of the Background

Along with the popularization of electrically-powered vehicles such as electric vehicles and plug-in hybrid vehicles, an increasing number of charging apparatuses for charging electrically-powered vehicles have been installed at parking areas of shopping malls, restaurants, convenience stores, and the like. It is preferable for such charging apparatuses to be capable of charging a plurality of electrically-powered vehicles effectively and rapidly.

In the related art, there has been known a charging apparatus that includes a rapid charger having a plurality of charging ports, and even-charging control means and preferential-charging control means to control the rapid charger (Japanese Patent Application Laid-open No. 2012-55028). The even-charging control means causes electrically-powered vehicles connected to the charging ports in use to be charged evenly and sequentially at a predetermined frequency. In contrast, when it is determined that charging to an electrically-powered vehicle with scheduled leaving time specified is not completed by the scheduled leaving time according to charging with the even-charging control means, the preferential-charging control means performs charging on the electrically-powered vehicle intensively prior to other electrically-powered vehicles.

According to a charging apparatus in the related art, an electrically-powered vehicle can be preferentially charged owing to that scheduled leaving time is specified by its user.

BRIEF SUMMARY

According to the charging apparatus in the related art, there is a fear that an electrically-powered vehicle without scheduled leaving time specified is not charged at all even after a fair amount of time elapsed. For example, there may be a case that a user considers that charging is to be performed to some extent even without specifying scheduled leaving time since an enough time period exists by scheduled leaving time. Further, there may also be a case that a user forgets to specify scheduled leaving time. In such cases, if a plurality of electrically-powered vehicles with scheduled leaving time specified respectively start to be charged continuously after an own electrically-powered vehicle starts to be charged, there is a possibility that the own electrically-powered vehicle is not charged at all until all the electrically-powered vehicles starting to be charged later are completely charged to cause inconvenience and inequity.

An object of the present invention is to provide a charging apparatus that is more convenient and equitable for users than before.

A charging apparatus for an electrically-powered vehicle, comprising:
a plurality of charging ports;
a charging portion configured to output charge current to the charging ports;
an input portion configured to receive selection of a user among a plurality of charge patterns prepared in advance including a charge-history-dependent charge pattern to determine the charge current based on charge history information regarding a charge history of the electrically-powered vehicle;
a selection result storing portion configured to store a result of the selection;
a history information storing portion configured to store the charge history information of the electrically-powered vehicles connected to any of the charging ports; and
a controller configured to refer to the selection result storing portion, control the charging portion in accordance with a selected charge pattern, the controller configured to determine priorities of the electrically-powered vehicles based on the charge history information when the charge-history-dependent charge pattern is selected and two or more electrically-powered vehicles are connected to the charging ports.

According to the present invention, it is possible to provide a charging apparatus that is more convenient and equitable for users than before.

BRIEF DESCRIPTION OF DRAWINGS

FIG. 1 is a block diagram of a charging apparatus of an embodiment.

DETAILED DESCRIPTION

In the following, a charging system of an embodiment will be described with reference to FIG. 1.

FIG. 1 illustrates a charging apparatus 10 of the present embodiment. The charging apparatus 10 includes a plurality of charging ports (first, second, and third charging ports 12A, 12B, 12C), a charging portion 11, an input portion 13, a selection result storing portion 14, a history information storing portion 15, a controller 16, and a clock portion 17. The charging portion 11 includes a power conversion circuit that outputs charge current to the charging ports. The input portion 13 is a user interface device such as a touch panel display. Each of the selection result storing portion 14 and the history information storing portion 15 is structured with a volatile memory such as a random access memory and/or non-volatile memory such as a flash memory. The controller 16 includes a micro-processing unit (MPU) that controls the charging portion 11.

The charging apparatus 10 charges one or more electrically-powered vehicles connected to any of the three charging ports 12A, 12B, 12C in accordance with a charge pattern selected by a user U among a plurality of charge patterns that are prepared in advance. For example, the user U may be a manager to manage the charging apparatus 10 or a user to charge an own electrically-powered vehicle with the charging apparatus 10. In FIG. 1, an electrically-powered vehicle EVA is connected to the first charging port 12A and an electrically-powered vehicle EVB is connected to the second charging port 12B.

Each of the three charging ports 12A, 12B, 12C has a connecter shaped as defined by a standard. For example, when the electrically-powered vehicle EVA is connected to the first charging port 12A, there are established an output route of charge current from the charging portion 11 to the electrically-powered vehicle EVA and a transmission route of a variety of information from the electrically-powered vehicle EVA to the charging portion 11. The variety of information includes unique identification information of the electrically-powered vehicle EVA and SOC information regarding a state of charge (SOC) of the electrically-powered vehicle EVA.

The charging portion 11 outputs charge current to the three charging port 12A, 12B, 12C under control of the controller 16. The charging portion 11 outputs charge current within a predetermined range of output power capacity. For example, in a case that output power capacity is 50 kW and voltage to be output to the electrically-controlled vehicle EVA is 400 V, the charging portion 11 outputs charge current of 125 A (=50000/400) at maximum. The charging portion 11 may output charge current of 125 A to one electrically-powered vehicle or to a plurality of electrically-powered vehicles in appropriate proportions.

The input portion 13 receives input from the user U. Specifically, the input portion 13 displays a plurality of charge patterns on a setting screen called up by a manager. After any of the charge patterns is selected, the input portion 13 stores a selection result in the selection result storing portion 14. Further, when the electrically-powered vehicle EVA is connected to the first charging port 12A, the input portion 13 displays a charge start screen that includes a charge start button. When the user U touches the charge start button, the input portion 13 informs the controller 16 of that the charge start button has been touched. Then, the charging portion 11 starts to output charge power to the first charging port 12A.

When the electrically-powered vehicle EVA is connected to the first charging port 12A, the controller 16 obtains unique identification information and SOC information of the electrically-powered vehicle EVA. The controller 16 specifies current time (connection time) as referring to the clock portion 17. The controller 16 stores, in the history information storing portion 15, connection-time information regarding time of connection, the unique identification information, and the SOC information in association with one another as charge history information. When connection between the first charging port 12A and the electrically-powered vehicle EVA is released, the controller 16 specifies current time (connection release time) as referring to the clock portion 17. The controller 16 stores, in the history information storing portion 15, connection release time information regarding the connection release time in association with the unique identification information and the like stored at the time of connection. Thus, charge history information of electrically-powered vehicles that have been charged by the charging apparatus 10 is accumulated in the history information storing portion 15.

It is preferable that each information included in the charge history information is denoted by average of charge histories of several times in the past. For example, in a case that connection time before last of the electrically-powered vehicle EVA is 17:00, last connection time thereof is 17:30, and current connection time thereof is 17:12, it is preferable that the history information storing portion 15 stores the average being 17:14 as the connection-time information. The same applies to the connection release time information and the SOC information. According to the above, priorities for charging are determined based on objective charge history in the past of electrically-powered vehicles to be charged without relying on scheduled leaving time specified by users. Accordingly, accuracy of determination and estimation is improved in charging in accordance with a later-described second charge pattern.

When one electrically-powered vehicle is to be charged, the controller 16 sets charge current for the electrically-powered vehicle at the maximum charge current (e.g., 125 A). When two or more electrically-powered vehicles are to be charged, the controller 16 determines charge current for each electrically-powered vehicle in accordance with a charge pattern selected by a manager as referring to the selection result storing portion 14. The controller 16 can obtain an SOC of each electrically-powered vehicle during charging in real time.

In the present embodiment, a first charge pattern and a second charge pattern are prepared in advance. The first charge pattern is preferably adopted for the charging apparatus 10 installed at a parking area of a convenience store or the like in which a parking duration is estimated to be less than 30 minutes. The second charge pattern is preferably adopted for the charging apparatus 10 installed at a parking area of a restaurant, a large shopping mall, or the like in which a parking duration is estimated to be 30 minutes or longer. In the following, these charge patterns will be described in detail.

First Charge Pattern

When charge current for each of two or more electrically-powered vehicles is to be determined in accordance with the first charge pattern, the controller 16 obtains an SOC of each electrically-powered vehicle. The controller 16 classifies the electrically-powered vehicles, for example, into first to fourth groups based on the obtained SOCs. Specifically, an SOC of the first group is set to be lower than 25%. An SOC of the second group is set to be 25% or higher and lower than 50%. An SOC of the third group is set to be 50% or higher and lower than 80%. An SOC of the fourth group is set to be 80% or higher.

Subsequently, the controller 16 determines charge current for each electrically-powered vehicle based on the classification result and a weight coefficient previously set for each group. In the present embodiment, weight coefficients for the first, second, third, and fourth groups are set to 8, 5, 3, and 2, respectively. Here, it is assumed, for example, that two electrically-powered vehicles in the first group and one electrically-powered vehicle in the second group are to be charged. The controller 16 determines charge current for the electrically-powered vehicles in the first group through calculation as "(maximum charge current)×8/(8×2+5×1)". Further, the controller 16 determines charge current for the electrically-powered vehicle in the second group through calculation as "(maximum charge current)×5/(8×2+5×1)". As a result, the charging portion 11 outputs relatively large charge current to the electrically-powered vehicles in the first group.

In a case that two or more electrically-powered vehicles are classified into groups that are not adjacent to each other, the controller 16 assigns a higher priority for charging to an electrically-powered vehicle in a group with a low SOC while charge current for an electrically-powered vehicle in a group with a high SOC is set to 0 A. Here, it is assumed, for example, that one electrically-powered vehicle in the first group and one electrically-powered vehicle in the third group are to be charged. The controller 16 sets charge current for the electrically-powered vehicle in the third group to 0 A. Further, the controller 16 sets charge current for the electrically-powered vehicle in the first group to the maximum charge current. When the SOC increases to 25% or higher with charging only to the electrically-powered vehicle in the first group, the electrically-powered vehicle is shifted into the second group. Then, the controller 16 varies charge current for the electrically-powered vehicle that was originally classified into the first group to charge current calculated as "(maximum charge current)×5/(5×1+3×1)". Further, the controller 16 varies charge current for the electrically-powered vehicle in the third group to charge current calculated as "(maximum charge current)×3/(5×1+3×1)".

Based on SOCs varying with every moment of the electrically-powered vehicles while being charged, the controller 16 reclassifies the electrically-powered vehicles into the first to fourth groups. In accordance with the reclassification result, the controller 16 varies charge current of each electrically-powered vehicle. The controller 16 causes the electrically-powered vehicle with an SOC at the time of connection (connection-time SOC) thereof being lower than 50% to be continuously charged until the SOC reaches 80%. The controller 16 causes the electrically-powered vehicle with a connection-time SOC thereof being 50% or higher to be continuously charged until the SOC reaches 100%.

Thus, the charge history information stored in the history information storing portion 15 is not referred to in charging in accordance with the first charge pattern. That is, the first charge pattern is a charge-history-independent charge pattern. According to the first charge pattern, a user is less likely to feel inconvenience to be caused by that charging is not performed at all on an electrically-powered vehicle with a low SOC having an urgent need for being charged. Here, an electrically-powered vehicle with a high SOC can travel a certain distance without being charged. Accordingly, a user of the electrically-powered vehicle with a high SOC is less likely to be frustrated even when charging to the electrically-powered vehicle is delayed.

Second Charge Pattern

When charge current for each of two or more electrically-powered vehicles is to be determined in accordance with the second charge pattern, the controller 16 firstly obtains unique identification information of each electrically-powered vehicle to be charged. The controller 16 determines a priority for charging to each electrically-powered vehicle based on the charge history information stored in the history information storing portion 15 as being associated with the obtained unique identification information. Then, the controller 16 determines charge current for each electrically-powered vehicle in accordance with the priority. Thus, the second charge pattern is a charge-history-dependent charge pattern.

The controller 16 determines the priorities under determination conditions (i) to (iii);
(i) whether or not difference between current connection time and past connection time average stored in the history information storing portion 15 is within a predetermined range (e.g., between −20 minutes and +20 minutes inclusive),
(ii) whether or not difference between current connection-time SOC and past connection-time SOC average stored in the history information storing portion 15 is within a predetermined range (e.g., between −10% and +10% inclusive), and
(iii) whether or not a time period from current time to past connection release time average stored in the history information storing portion 15 is expected to be adequate. The controller 16 assigns a lower priority for charging to an electrically-powered vehicle that satisfies all the three conditions and causes other electrically-powered vehicles to be charged preferentially.

The controller 16 determines condition (iii), for example, in accordance with the following procedure.

(iii-1) Calculate an allowable time period of an electrically-powered vehicle for determination with the following expression.

Allowable time period[h]=Battery capacity[kWh]×30 [%]/Output power capacity [kW]

(iii-2) Calculate a charge duration (necessary charge duration) for charging the electrically-powered vehicle for determination at the maximum charge current until the SOC thereof reaches a predetermined SOC (e.g., 80%, the same applies hereafter) after charging to other electrically-powered vehicles is completed.

(iii-3) Perform comparison between time obtained by subtracting the allowable time period and the necessary charge duration from the past connection release time average and time at which charging to the other electrically-powered vehicles is to be completed. When the former is later than the latter, the time period is determined to be adequate. When the latter is later than the former, the time period is not determined to be adequate.

For example, in the following case, regarding two electrically-powered vehicles EVA, EVB connected to the charging apparatus 10, a lower priority for charging is assigned to the electrically-powered vehicle EVA while a higher priority for charging is assigned to the electrically-powered vehicle EVB.

Output power capacity of the charging apparatus 10: 50 kW
Battery capacity of the electrically-powered vehicle EVA: 24 kWh
Current connection time of the electrically-powered vehicle EVA: 12:00 (current time)
Current connection-time SOC of the electrically-powered vehicle EVA: 50%
Past connection time average of the electrically-powered vehicle EVA: 12:10
Past connection-time SOC average of the electrically-powered vehicle EVA: 45%
Past connection release time average of the electrically-powered vehicle EVA: 13:00
Necessary charge duration for the electrically-powered vehicle EVA: 8.6 minutes
Necessary charge duration for the electrically-powered vehicle EVB: 20 minutes
No charge history information of the electrically-powered vehicle EVB stored in the history information storing portion 15

Regarding the electrically-powered vehicle EVA, condition (i) is satisfied while difference between current connection time and past connection time average is within the range between −20 minutes and +20 minutes inclusive, and condition (ii) is satisfied while difference between current connection-time SOC and past connection-time SOC average is within the range between −10% and +10% inclusive. Time (12:43) obtained by subtracting the allowable time period (8.6 minutes=24 [kWh]×30 [%]/50 [kW]) and the necessary charge duration (8.6 minutes) of the electrically-powered vehicle EVA from the past connection release time average (13:00) of the electrically-powered vehicle EVA is later than time (12:20=12:00+0:20) at which charging to the electrically-powered vehicle EVB is to be completed. That is, charging to the electrically-powered vehicle EVA is expected to be completed by 13:00 without being tight on time even when charging to the electrically-powered vehicle EVB is performed preferentially. Thus, condition (iii) is satisfied.

In this case, the charging portion 11 charges the electrically-powered vehicle EVB at the maximum charge current (125 A) until the SOC thereof reaches 80%, and thereafter, charges the electrically-powered vehicle EVA at 125 A until the SOC thereof reaches 80%.

In contrast, in a case that the past connection release time average of the electrically-powered vehicle EVA is 12:30, the priority for charging to the electrically-powered vehicle EVA cannot be lowered. Here, time (12:13) obtained by subtracting the allowable time period (8.6 minutes) and the necessary charge duration (8.6 minutes) of the electrically-powered vehicle EVA from the past connection release time average (12:30) of the electrically-powered vehicle EVA is earlier than time (12:20) at which charging to the electrically-powered vehicle EVB is expected to be completed. Therefore, if charging to the electrically-powered vehicle EVB is performed preferentially, it is expected that charging to the electrically-powered vehicle EVA up to 80% is not completed by 12:30 or is performed tightly in time even if the charging is completed.

In this case, the charging portion 11 outputs, to both the electrically-powered vehicles EVA, EVB, charge current (62.5 A) obtained by equally dividing the maximum charge current 125 A. When the SOC of one electrically-powered vehicle reaches 80% in first, charge current to the other electrically-powered vehicle is varied to the maximum charge current (125 A).

Here, determination conditions (i), (ii) are for determining whether or not a behavior pattern of the electrically-powered vehicle for determination is usual. When determination conditions (i), (ii) are satisfied, the behavior pattern of the electrically-powered vehicle seems to be usual. In this case, it is expected that connection of the electrically-powered vehicle is released at time close to the past connection release time average. In contrast, when determination conditions (i), (ii) are not satisfied, the behavior pattern of the electrically-powered vehicle seems to be unusual. In this case, since connection release time of the electrically-powered vehicle cannot be presumed based on the past connection release time average, the priority is not determined based on the past connection release time average.

OPERATIONAL EXAMPLES

Description will be provided on specific operational examples of the charging apparatus 10 of the embodiment. Operational examples 1 to 3 are examples when the first charge pattern is selected in advance by a user U (manager). Operational examples 4 to 7 are examples when the second charge pattern is selected in advance by a user U (manager).

Operational Example 1: First Charge Pattern

An electrically-powered vehicle EVA is connected to the charging port 12A at time 12:00. An electrically-powered vehicle EVB is connected to the charging port 12B at time 12:05. Battery capacity of each of the electrically-powered vehicles EVA, EVB is 24 kWh. Output power capacity of the charging portion 11 is 40 kW with the maximum charge current thereof being 100 A. A connection-time SOC of the electrically-powered vehicle EVA is 10% being in the first group and a connection-time SOC of the electrically-powered vehicle EVB is 50% being in the third group.

Table 1 shows temporal change of SOCs and charge current of the electrically-powered vehicles EVA, EVB of the present operational example. A number in parentheses of an SOC denotes a number of a group into which the SOC is classified. The SOCs of the electrically-powered vehicles EVA, EVB varying with time contains consideration of charge voltage variation, loss, efficiency, and the like as being different from values simply calculated based on the described conditions (the battery capacities of the electrically-powered vehicles EVA, EVB, the output power capacity of the charging portion 11, and elapsed time from charge starting). The above is the same for operational examples 2 to 7 (tables 2 to 7) described later.

TABLE 1

| Time | State of Charge (SOC) [%] | | Charge current [A] | |
|---|---|---|---|---|
| | EVA | EVB | EVA | EVB |
| 12:00 | 10 (1) | — | 100.0 | — |
| 12:05 | 21 (1) | 50 (3) | 100.0 | 0.0 |
| 12:07 | 25 (2) | 50 (3) | 62.5 | 37.5 |
| 12:27 | 50 (3) | 66 (3) | 50.0 | 50.0 |
| 12:40 | 65 (3) | 80 (4) | 100.0 | 0.0 |
| 12:47 | 80 (4) | 80 (4) | 0.0 | 0.0 |

The electrically-powered vehicle EVA whose SOC is 10% connected at time 12:00 is classified into the first group. At that time, another electrically-powered vehicle is not connected. Therefore, the charging portion 11 outputs the maximum charge current (100 A) to the electrically-powered vehicle EVA.

The electrically-powered vehicle EVB whose SOC is 50% connected at time 12:05 is classified into the third group. The first group to which the electrically-powered vehicle EVA whose SOC is 21% belongs is not adjacent to the third group to which the electrically-powered vehicle EVB belongs. Therefore, the charging portion 11 continuously outputs the maximum charge current (100 A) to the electrically-powered vehicle EVA without outputting charge current to the electrically-powered vehicle EVB. Thus, the electrically-powered vehicle EVA in the first group with a low SOC is charged preferentially.

When the SOC of the electrically-powered vehicle EVA reaches 25% at time 12:07, the electrically-powered vehicle EVA belongs to the second group that is adjacent to the third group to which the electrically-powered vehicle EVB belongs. Therefore, the charging portion 11 varies the charge current for the electrically-powered vehicle EVA to 62.5 A (=100×5/(5+3)) and the charge current for the electrically-powered vehicle EVB to 37.5 A (=100×3/(5+3)). Thus, charging of the electrically-powered vehicle EVA is performed slightly preferentially.

When the SOC of the electrically-powered vehicle EVA reaches 50% at time 12:27, both the electrically-powered vehicle EVA and the electrically-powered vehicle EVB whose SOC is 66% belong to the third group. Therefore, the charging portion 11 varies the charge current for each of the electrically-powered vehicles EVA, EVB to 50.0 A (=100× 3/(3+3)). Thus, the electrically-powered vehicles EVA, EVB are charged evenly.

When the SOC of the electrically-powered vehicle EVB reaches the target SOC being 80% at time 12:40, the charging portion 11 varies the charge current for the electrically-powered vehicle EVB to 0 A to end charging to the electrically-powered vehicle EVB. Meanwhile, the charging portion 11 varies the charge current for the electrically-powered vehicle EVA to the maximum charge current (100 A).

When the SOC of the electrically-powered vehicle EVA reaches 80% at time 12:47, the charging portion 11 ends charging to the electrically-powered vehicle EVA as well.

Operational Example 2: First Charge Pattern

An electrically-powered vehicle EVB is connected to the charging port 12B at time 12:00. An electrically-powered vehicle EVA is connected to the charging port 12A at time 12:05. Battery capacity of each of the electrically-powered vehicles EVA, EVB is 24 kWh. Output power capacity of the charging portion 11 is 40 kW with the maximum charge current thereof being 100 A. A connection-time SOC of the electrically-powered vehicle EVB is 50% being in the third group and a connection-time SOC of the electrically-powered vehicle EVA is 10% being in the first group.

Table 2 shows temporal change of SOCs and charge current of the electrically-powered vehicles EVA, EVB of the present operational example.

TABLE 2

| Time | State of Charge (SOC) [%] EVA | State of Charge (SOC) [%] EVB | Charge current [A] EVA | Charge current [A] EVB |
|---|---|---|---|---|
| 12:00 | — | 50 (3) | — | 100.0 |
| 12:05 | 10 (1) | 61 (3) | 100.0 | 0.0 |
| 12:12 | 25 (2) | 61 (3) | 62.5 | 37.5 |
| 12:31 | 50 (3) | 76 (3) | 50.0 | 50.0 |
| 12:35 | 55 (3) | 80 (4) | 100.0 | 0.0 |
| 12:47 | 80 (4) | 80 (4) | 0.0 | 0.0 |

The electrically-powered vehicle EVB whose SOC is 50% connected at time 12:00 is classified into the third group. At that time, another electrically-powered vehicle is not connected. Therefore, the charging portion 11 outputs the maximum charge current (100 A) to the electrically-powered vehicle EVB.

The electrically-powered vehicle EVA whose SOC is 10% connected at time 12:05 is classified into the first group. The first group to which the electrically-powered vehicle EVA belongs is not adjacent to the third group to which the electrically-powered vehicle EVB whose SOC is 61%. Therefore, the charging portion 11 varies the charge current for the electrically-powered vehicle EVB to 0 A and outputs the maximum charge current (100 A) to the electrically-powered vehicle EVA.

When the SOC of the electrically-powered vehicle EVA reaches 25% at time 12:12, the electrically-powered vehicle EVA belongs to the second group that is adjacent to the third group to which the electrically-powered vehicle EVB belongs. Therefore, the charging portion 11 varies the charge current for the electrically-powered vehicle EVA to 62.5 A ($=100 \times 5/(5+3)$) and the charge current for the electrically-powered vehicle EVB to 37.5 A ($=100 \times 3/(5+3)$).

When the SOC of the electrically-powered vehicle EVA reaches 50% at time 12:31, both the electrically-powered vehicle EVA and the electrically-powered vehicle EVB whose SOC is 76% belong to the third group. Therefore, the charging portion 11 varies the charge current to 50.0 A ($=100 \times 3/(3+3)$) respectively for both the electrically-powered vehicles EVA, EVB.

When the SOC of the electrically-powered vehicle EVB reaches the target SOC being 80% at time 12:35, the charging portion 11 varies the charge current for the electrically-powered vehicle EVB to 0 A to end charging to the electrically-powered vehicle EVB. Meanwhile, the charging portion 11 varies the charge current for the electrically-powered vehicle EVA to the maximum charge current (100 A).

When the SOC of the electrically-powered vehicle EVA reaches 80% at time 12:47, the charging portion 11 ends charging to the electrically-powered vehicle EVA as well.

Operational Example 3: First Charge Pattern

An electrically-powered vehicle EVA is connected to the charging port 12A at time 12:00. An electrically-powered vehicle EVB is connected to the charging port 12B at time 12:05. An electrically-powered vehicle EVC is connected to the charging port 12C at time 12:10. Battery capacity of each of the electrically-powered vehicles EVA, EVB, EVC is 24 kWh. Output power capacity of the charging portion 11 is 50 kW with the maximum charge current thereof being 125 A. A connection-time SOC of the electrically-powered vehicle EVA is 10% being in the first group, a connection-time SOC of the electrically-powered vehicle EVB is 50% being in the third group, and a connection-time SOC of the electrically-powered vehicle EVC is 20% being in the first group.

Table 3 shows temporal change of SOCs and charge current of the electrically-powered vehicles EVA, EVB, EVC of the present operational example.

TABLE 3

| Time | State of Charge (SOC) [%] EVA | State of Charge (SOC) [%] EVB | State of Charge (SOC) [%] EVC | Charge current [A] EVA | Charge current [A] EVB | Charge current [A] EVC |
|---|---|---|---|---|---|---|
| 12:00 | 10 (1) | — | — | 125.0 | — | — |
| 12:05 | 23 (1) | 50 (3) | — | 125.0 | 0.0 | — |
| 12:06 | 25 (2) | 50 (3) | — | 78.1 | 46.9 | — |
| 12:10 | 32 (2) | 55 (3) | 20 (1) | 48.1 | 0.0 | 76.9 |
| 12:13 | 35 (2) | 55 (3) | 25 (2) | 48.1 | 28.8 | 48.1 |
| 12:27 | 50 (3) | 63 (3) | 39 (2) | 34.1 | 34.1 | 56.8 |
| 12:36 | 56 (3) | 70 (3) | 50 (3) | 41.7 | 41.7 | 41.7 |
| 12:48 | 67 (3) | 80 (4) | 61 (3) | 62.5 | 0.0 | 62.5 |
| 12:58 | 80 (4) | 80 (4) | 74 (3) | 0.0 | 0.0 | 125.0 |
| 13:00 | 80 (4) | 80 (4) | 80 (4) | 0.0 | 0.0 | 0.0 |

The electrically-powered vehicle EVA whose SOC is 10% connected at time 12:00 is classified into the first group. At that time, another electrically-powered vehicle is not connected. Therefore, the charging portion 11 outputs the maximum charge current (125 A) to the electrically-powered vehicle EVA.

The electrically-powered vehicle EVB whose SOC is 50% connected at time 12:05 is classified into the third group. The first group to which the electrically-powered vehicle EVA whose SOC is 23% belongs is not adjacent to the third group to which the electrically-powered vehicle EVB belongs. Therefore, the charging portion 11 continuously outputs the maximum charge current (125 A) to the electrically-powered vehicle EVA without outputting charge current to the electrically-powered vehicle EVB.

When the SOC of the electrically-powered vehicle EVA reaches 25% at time 12:06, the electrically-powered vehicle EVA belongs to the second group that is adjacent to the third group to which the electrically-powered vehicle EVB belongs. Therefore, the charging portion 11 varies the charge current for the electrically-powered vehicle EVA to 78.1 A ($=125 \times 5/(5+3)$) and the charge current for the electrically-powered vehicle EVB to 46.9 A ($=125 \times 3/(5+3)$).

The electrically-powered vehicle EVC whose SOC is 20% connected at time 12:10 is classified into the first group.

The first group to which the electrically-powered vehicle EVC belongs is not adjacent to the third group to which the electrically-powered vehicle EVB whose SOC is 55% belongs. Therefore, the charging portion 11 varies the charge current for the electrically-powered vehicle EVB to 0 A. Meanwhile, the first group to which the electrically-powered vehicle EVC belongs is adjacent to the second group to which the electrically-powered vehicle EVA whose SOC is 32% belongs. Therefore, the charging portion 11 varies the charge current for the electrically-powered vehicle EVC to 76.9 A (=125×8/(8+5)) and the charge current for the electrically-powered vehicle EVA to 48.1 A (=125×5/(8+5)).

When the SOC of the electrically-powered vehicle EVC reaches 25% at time 12:13, the electrically-powered vehicle EVC belongs to the second group that is adjacent to the third group to which the electrically-powered vehicle EVB whose SOC is 55% belongs. Further, both the electrically-powered vehicle EVC and the electrically-powered vehicle EVA whose SOC is 35% belong to the second group. Therefore, the charging portion 11 varies the charge current for each of the electrically-powered vehicles EVA, EVC to 48.1 A (=125×5/(5×2+3)) and the charge current for the electrically-powered vehicle EVB to 28.8 A (=125×3/(5×2+3)).

When the SOC of the electrically-powered vehicle EVA reaches 50% at time 12:27, the charging portion 11 varies the charge current for each of the electrically-powered vehicles EVA, EVB to 34.1 A (=125×3/(5+3×2)) and the charge current for the electrically-powered vehicle EVC to 56.8 A (=125×5/(5+3×2)).

Thereafter, when any of the electrically-powered vehicles EVA, EVB, EVC becomes to belong to a different group or when the SOC of any of the electrically-powered vehicles EVA, EVB, EVC reaches the target SOC being 80% in accordance with charging thereto, the charging portion 11 varies proportions of charge current to be output to the respective electrically-powered vehicles EVA, EVB, EVC.

Operational Example 4: Second Charge Pattern

An electrically-powered vehicle EVA is connected to the charging port 12A at time 12:00. An electrically-powered vehicle EVB is connected to the charging port 12B at time 12:15. An electrically-powered vehicle EVC is connected to the charging port 12C at time 12:25. Battery capacity of each of the electrically-powered vehicles EVA, EVC is 24 kWh. Battery capacity of the electrically-powered vehicle EVB is 12 kWh. Output power capacity of the charging portion 11 is 50 kW with the maximum charge current thereof being 125 A. A connection-time SOC of the electrically-powered vehicle EVA is 10%, a connection-time SOC of the electrically-powered vehicle EVB is 15%, and a connection-time SOC of the electrically-powered vehicle EVC is 25%. Any of the electrically-powered vehicles EVA, ECB, EVC does not satisfy determination conditions (i), (ii).

Table 4 shows temporal change of SOCs, charge current, and expected charge completion time of the electrically-powered vehicles EVA, EVB, EVC of the present operational example.

TABLE 4

| Time | State of Charge (SOC) [%] | | | Charge current [A] | | | Expected charge completion time | | |
|---|---|---|---|---|---|---|---|---|---|
| | EVA | EVB | EVC | EVA | EVB | EVC | EVA | EVB | EVC |
| 12:00 | 10 | — | — | 125.0 | — | — | 12:26 | — | — |
| 12:15 | 50 | 15 | — | 62.5 | 62.5 | — | 12:38 | 12:39 | — |
| 12:25 | 63 | 42 | 25 | 41.7 | 41.7 | 41.7 | 12:44 | 12:46 | 12:59 |
| 12:44 | 80 | 75 | 42 | 0.0 | 62.5 | 62.5 | — | 12:46 | 12:59 |
| 12:46 | 80 | 80 | 44 | 0.0 | 0.0 | 125.0 | — | — | 12:59 |
| 12:59 | 80 | 80 | 80 | 0.0 | 0.0 | 0.0 | — | — | — |

At time 12:00 when the electrically-powered vehicle EVA whose SOC is 10% is connected, another electrically-powered vehicle is not connected. Therefore, the charging portion 11 outputs the maximum charge current (125 A) to the electrically-powered vehicle EVA. Since only one electrically-powered vehicle is to be charged, the controller 16 does not perform priority determination.

When the electrically-powered vehicle EVB whose SOC is 15% is connected at time 12:15, two electrically-powered vehicles are to be charged. The controller 16 determines priorities for charging to the electrically-powered vehicles EVA, EVB based on determination conditions (i) to (iii). In the present operational example, both the electrically-powered vehicles EVA, EVB do not satisfy determination conditions (i), (ii). Therefore, the controller 16 determines not to lower a priority for charging to the electrically-powered vehicles EVA, EVB. The charging portion 11 outputs 62.5 A (=125/2) to each of the electrically-powered vehicles EVA, EVB.

When the electrically-powered vehicle EVC whose SOC is 25% is connected at time 12:25, three electrically-powered vehicles are to be charged. The controller 16 determines a priority for charging to the electrically-powered vehicle EVC. In the present operational example, the electrically-powered vehicle EVC does not satisfy determination conditions (i), (ii) as well. Therefore, the controller 16 determines not to lower a priority for charging to the electrically-powered vehicle EVC. The charging portion 11 outputs 41.7 A (=125/3) to each of the electrically-powered vehicles EVA, EVB, EVC.

When the SOC of the electrically-powered vehicle EVA reaches the target SOC being 80% at time 12:44, the charging portion 11 varies the charge current for the electrically-powered vehicle EVA to 0 A to end charging to the electrically-powered vehicle EVA. The charging portion 11 varies the charge current for each of the electrically-powered vehicles EVB, EVC to 62.5 A (125/2).

When the SOC of the electrically-powered vehicle EVB reaches the target SOC being 80% at time 12:46, the charging portion 11 varies the charge current for the electrically-powered vehicle EVB to 0 A to end charging to the electrically-powered vehicle EVB. The charging portion 11 varies the charge current for the electrically-powered vehicle EVC to the maximum charge current (125 A).

When the SOC of the electrically-powered vehicle EVC reaches the target SOC being 80% at time 12:59, the charging portion 11 ends charging to the electrically-powered vehicle EVC as well.

Operational Example 5: Second Charge Pattern

An electrically-powered vehicle EVA is connected to the charging port 12A at time 12:00. An electrically-powered vehicle EVB is connected to the charging port 12B at time 12:05. Battery capacity of each of the electrically-powered vehicles EVA, EVB is 24 kWh. Output power capacity of the charging portion 11 is 50 kW with the maximum charge current thereof being 125 A. A connection-time SOC of the electrically-powered vehicle EVA is 30% and a connection-time SOC of the electrically-powered vehicle EVB is 45%. Past connection release time average of each of the electrically-powered vehicles EVA, EVB is 12:50. Both the electrically-powered vehicles EVA, EVB satisfy determination conditions (i), (ii).

Table 5 shows temporal change of SOCs, charge current, and expected charge completion time of the electrically-powered vehicles EVA, EVB of the present operational example.

TABLE 5

| | State of Charge (SOC) [%] | | Charge current [A] | | Expected charge completion time | |
|---|---|---|---|---|---|---|
| Time | EVA | EVB | EVA | EVB | EVA | EVB |
| 12:00 | 30 | — | 125.0 | — | 12:19 | — |
| 12:05 | 43 | 45 | 62.5 | 62.5 | 12:32 | 12:31 |
| 12:31 | 78 | 80 | 125.0 | 0.0 | 12:32 | — |
| 12:32 | 80 | 80 | 0.0 | 0.0 | — | — |

At time 12:00 when the electrically-powered vehicle EVA whose SOC is 30% is connected, another electrically-powered vehicle is not connected. Therefore, the charging portion 11 outputs the maximum charge current (125 A) to the electrically-powered vehicle EVA. Since only one electrically-powered vehicle is to be charged, the controller 16 does not perform priority determination.

When the electrically-powered vehicle EVB whose SOC is 45% is connected at time 12:05, two electrically-powered vehicles are to be charged. The controller 16 determines priorities for charging to the electrically-powered vehicles EVA, EVB based on determination conditions (i) to (iii). Time (12:27) obtained by subtracting an allowable time period (8.6 minutes=24 [kWh]×30 [%]/50 [kW]) and a necessary charge duration (14 minutes=12:19−12:05) of the electrically-powered vehicle EVA from past connection release time average (12:50) of the electrically-powered vehicle EVA is later than time (12:18) at which charging for the electrically-powered vehicle EVB is to be completed. Thus, the electrically-powered vehicle EVA satisfies determination condition (iii). Time (12:28) obtained by subtracting an allowable time period (8.6 minutes=24 [kWh]×30 [%]/50 [kW]) and a necessary charge duration (13 minutes=12:18−12:05) of the electrically-powered vehicle EVB from past connection release time average (12:50) of the electrically-powered vehicle EVB is later than time (12:19) at which charging for the electrically-powered vehicle EVA is to be completed. Thus, the electrically-powered vehicle EVB satisfies determination condition (iii). Further, both the electrically-powered vehicles EVA, EVB also satisfy determination conditions (i), (ii). Accordingly, both the electrically-powered vehicles EVA, EVB satisfy all the determination conditions (i) to (iii). Here, priorities for charging to all the electrically-powered vehicles to be charged are not supposed to be lowered concurrently. Consequently, the controller 16 determines not to lower priorities for charging to the electrically-powered vehicles EVA, EVB. The charging portion 11 outputs 62.5 A (=125/2) to each of the electrically-powered vehicles EVA, EVB. Here, the expected charge completion time "12:31" of the electrically-powered vehicle EVB at time 12:05 in Table 5 represents time recalculated after the electrically-powered vehicles EVA, EVB are determined to be charged evenly.

When the SOC of the electrically-powered vehicle EVB reaches the target SOC being 80% at time 12:31, the charging portion 11 varies the charge current for the electrically-powered vehicle EVB to 0 A to end charging to the electrically-powered vehicle EVB. The charging portion 11 varies the charge current for the electrically-powered vehicle EVA to the maximum charge current (125 A).

When the SOC of the electrically-powered vehicle EVA reaches the target SOC being 80% at time 12:32, the charging portion 11 ends charging to the electrically-powered vehicle EVA as well.

Operational Example 6: Second Charge Pattern

An electrically-powered vehicle EVA is connected to the charging port 12A at time 12:00. An electrically-powered vehicle EVB is connected to the charging port 12B at time 12:15. Battery capacity of each of the electrically-powered vehicles EVA, EVB is 24 kWh. Output power capacity of the charging portion 11 is 50 kW with the maximum charge current thereof being 125 A. A connection-time SOC of the electrically-powered vehicle EVA is 10% and a connection-time SOC of the electrically-powered vehicle EVB is 20%. Past connection release time average of the electrically-powered vehicle EVA, EVA is 13:30. Here, the electrically-powered vehicle EVA satisfies determination conditions (i), (ii), while the electrically-powered vehicle EVB does not satisfy determination conditions (i), (ii).

Table 6 shows temporal change of SOCs, charge current, and expected charge completion time of the electrically-powered vehicles EVA, EVB of the present operational example.

TABLE 6

| | State of Charge (SOC) [%] | | Charge current [A] | | Expected charge completion time | |
|---|---|---|---|---|---|---|
| Time | EVA | EVB | EVA | EVB | EVA | EVB |
| 12:00 | 10 | — | 125.0 | — | 12:26 | — |
| 12:15 | 50 | 20 | 0.0 | 125.0 | — | 12:38 |
| 12:38 | 50 | 80 | 125.0 | 0.0 | 12:49 | — |
| 12:49 | 80 | 80 | 0.0 | 0.0 | — | — |

At time 12:00 when the electrically-powered vehicle EVA whose SOC is 10% is connected, another electrically-powered vehicle is not connected. Therefore, the charging portion 11 outputs the maximum charge current (125 A) to the electrically-powered vehicle EVA. Since only one electrically-powered vehicle is to be charged, the controller 16 does not perform priority determination.

When the electrically-powered vehicle EVB whose SOC is 20% is connected at time 12:15, two electrically-powered vehicles are to be charged. The controller 16 determines priorities for charging to the electrically-powered vehicles EVA, EVB based on determination conditions (i) to (iii). Time (13:10) obtained by subtracting an allowable time period (8.6 minutes=24 [kWh]×30 [%]/50 [kW]) and a necessary charge duration (11 minutes=12:49-12:38) of the electrically-powered vehicle EVA from past connection release time average (13:30) of the electrically-powered vehicle EVA is later than time (12:38) at which charging for the electrically-powered vehicle EVB is to be completed. Thus, the electrically-powered vehicle EVA satisfies determination condition (iii). Further, the electrically-powered vehicle EVA satisfies determination conditions (i), (ii). On the other hand, the electrically-powered vehicle EVB does not satisfy at least determination conditions (i), (ii). Therefore, the controller 16 determines to lower a priority for charging to the electrically-powered vehicle EVA. The charging portion 11 varies the charge current for the electrically-powered vehicle EVA to 0 A to suspend charging to the electrically-powered vehicle EVA. The charging portion 11 outputs the maximum charge current (125 A) to the electrically-powered vehicle EVB. Thus, the electrically-powered vehicle EVB is charged preferentially.

When the SOC of the electrically-powered vehicle EVB reaches the target SOC being 80% at time 12:38, the charging portion 11 varies the charge current for the electrically-powered vehicle EVB to 0 A to end charging to the electrically-powered vehicle EVB. The charging portion 11 varies the charge current for the electrically-powered vehicle EVA to the maximum charge current (125 A).

When the SOC of the electrically-powered vehicle EVA reaches the target SOC being 80% at time 12:49, the charging portion 11 ends charging to the electrically-powered vehicle EVA as well.

Operational Example 7: Second Charge Pattern

An electrically-powered vehicle EVA is connected to the charging port 12A at time 12:00. An electrically-powered vehicle EVB is connected to the charging port 12B at time 12:15. Battery capacity of each of the electrically-powered vehicles EVA, EVB is 24 kWh. Output power capacity of the charging portion 11 is 50 kW with the maximum charge current thereof being 125 A. A connection-time SOC of the electrically-powered vehicle EVA is 10% and a connection-time SOC of the electrically-powered vehicle EVB is 20%. Past connection release time average of the electrically-powered vehicle EVB is 13:30. Here, the electrically-powered vehicle EVB satisfies determination conditions (i), (ii), while the electrically-powered vehicle EVA does not satisfy determination conditions (i), (ii).

Table 7 shows temporal change of SOCs, charge current, and expected charge completion time of the electrically-powered vehicles EVA, EVB of the present operational example.

TABLE 7

| Time | State of Charge (SOC) [%] | | Charge current [A] | | Expected charge completion time | |
|---|---|---|---|---|---|---|
| | EVA | EVB | EVA | EVB | EVA | EVB |
| 12:00 | 10 | — | 125.0 | — | 12:26 | — |
| 12:15 | 50 | 20 | 125.0 | 0.0 | 12:26 | 12:49 |
| 12:26 | 80 | 20 | 0.0 | 125.0 | — | 12:49 |
| 12:49 | 80 | 80 | 0.0 | 0.0 | — | — |

At time 12:00 when the electrically-powered vehicle EVA whose SOC is 10% is connected, another electrically-powered vehicle is not connected. Therefore, the charging portion 11 outputs the maximum charge current (125 A) to the electrically-powered vehicle EVA. Since only one electrically-powered vehicle is to be charged, the controller 16 does not perform priority determination.

When the electrically-powered vehicle EVB whose SOC is 20% is connected at time 12:15, two electrically-powered vehicles are to be charged. The controller 16 determines priorities for charging to the electrically-powered vehicles EVA, EVB based on determination conditions (i) to (iii).

Time (12:58) obtained by subtracting an allowable time period (8.6 minutes=24 [kWh]×30 [%]/50 [kW]) and a necessary charge duration (23 minutes=12:49-12:26) of the electrically-powered vehicle EVB from past connection release time average (13:30) of the electrically-powered vehicle EVB is later than time (12:26) at which charging for the electrically-powered vehicle EVA is to be completed. Thus, the electrically-powered vehicle EVB satisfies determination condition (iii). Further, the electrically-powered vehicle EVB satisfies determination conditions (i), (ii). On the other hand, the electrically-powered vehicle EVA does not satisfy at least determination conditions (i), (ii). Therefore, the controller 16 determines to lower a priority for charging to the electrically-powered vehicle EVB. The charging portion 11 sets charge current for the electrically-powered vehicle EVB to 0 A and outputs the maximum charge current (125 A) continuously to the electrically-powered vehicle EVA. Thus, the electrically-powered vehicle EVA is charged preferentially.

When the SOC of the electrically-powered vehicle EVA reaches the target SOC being 80% at time 12:26, the charging portion 11 varies the charge current for the electrically-powered vehicle EVA to 0 A to end charging to the electrically-powered vehicle EVA. The charging portion 11 varies the charge current for the electrically-powered vehicle EVB to the maximum charge current (125 A).

When the SOC of the electrically-powered vehicle EVB reaches the target SOC being 80% at time 12:49, the charging portion 11 ends charging to the electrically-powered vehicle EVB as well.

Modified Examples

The charging apparatus of the present invention is not limited to the abovementioned embodiments.

For example, a third charge pattern being as the charge-history-dependent charge pattern may be prepared further as being different from the second charge pattern. The third charge pattern is preferably adopted for a charging apparatus installed at a parking area of a facility in which a parking duration is estimated to be several hours or longer. According to the third pattern, charging is continuously performed until an SOC reaches 100% irrespective of a connection-time SOC. According to the third charge pattern, in a case that an enough time period exists until connection release time expected through a charge history, it is preferable that charging is suspended when an SOC exceeds 80% and that the SOC reaches 100% slightly before the expected connection release time.

It is also possible to further prepare other charge patterns that are charge-history-dependent charge patterns and/or charge-history independent charge patterns.

According to some of prepared charge patterns, a higher priority may be assigned to charging to an electric vehicle than a priority to a plug-in hybrid vehicle. This is because a plug-in hybrid vehicle capable of travelling with a gasoline engine has a less urgent need compared to an electric vehicle. In this case, an electrically-powered vehicle to be charged is specified to be an electric vehicle or a plug-in hybrid vehicle based on unique identification information.

The first charge pattern may adopt classification other than being into four groups. Further, threshold values and weight coefficients of the groups may be appropriately changed in accordance with usage situations.

Among determination conditions (i) to (iii) of priorities for charging in accordance with the second charge pattern, determination conditions (i), (ii) may be appropriately changed as long as being capable of determining whether or not a behavior pattern of an electrically-powered vehicle to be determined is usual.

Expected charge completion time and a charge duration for charging in accordance with the second charge pattern may be calculated with a variety of calculation methods used in known charging apparatuses or improved methods thereof.

REFERENCE SIGNS LIST

10 Charging apparatus
11 Charging portion
12A, 12B, 12C Charging port
13 Input portion
14 Selection result storing portion
15 History information storing portion
16 Controller
17 Clock portion
EVA, EVB Electrically-powered vehicle
U User (Manager, User)

What is claimed is:

1. A charging apparatus for an electrically-powered vehicle, comprising:
a plurality of charging ports;
a charging portion configured to output charge current to the charging ports;
an input portion configured to receive selection of a charge pattern by a user among a plurality of charge patterns prepared in advance including a charge-history-dependent charge pattern to determine the charge current based on charge history information regarding a charge history of the electrically-powered vehicle;
a selection result storing portion configured to store a result of the selection;
a history information storing portion configured to store the charge history information of two or more electrically-powered vehicles connected to the charging ports; and
a controller configured to refer to the selection result storing portion and control the charging portion in accordance with a selected charge pattern,
the controller configured to determine priorities of the electrically-powered vehicles based on the charge history information when the charge-history-dependent charge pattern is selected and the two or more electrically-powered vehicles are connected to the charging ports, wherein,
when the charge-history-dependent charge pattern is selected and the two or more electrically-powered vehicles are connected to the charging ports, the controller determines whether or not a behavior pattern of each of the electrically-powered vehicles is usual based on the charge history information and determines to lower a priority of the electrically-powered vehicle whose behavior pattern has been determined as usual with respect to the other electrically-powered vehicle, and the charge history information includes connection-time information regarding a time of connection to the charging ports, SOC information regarding a state-of-charge (SOC) at the time of connection to the charging ports, and connection release time information regarding a time of connection releasing from the charging ports.

2. The charging apparatus according to claim 1, wherein the charge history information is expressed as an average of a plurality of charge histories, the connection-time information is an average of several past charge histories, the SOC information is an average of past connection-time SOC information, and the connection release time information is an average of several past connection release times.

3. The charging apparatus according to claim 1, wherein at least one of the charge patterns is a charge-history-independent charge pattern to determine the charge current irrelevantly to a charge history of the electrically-powered vehicle.

4. The charging apparatus according to claim 3, wherein, when the charge-history-independent charge pattern is selected and the two or more electrically-powered vehicles are connected to the charging ports, the controller classifies the electrically-powered vehicles into a plurality of groups based on current SOCs of the electrically-powered vehicles and determines the charge current for each group so that an electrically-powered vehicle with a low SOC is charged on a priority basis.

5. A charging apparatus for an electrically-powered vehicle, comprising:
a plurality of charging ports;
a charging portion configured to output charge current to the charging ports;
an input portion configured to receive selection of a user among a plurality of charge patterns prepared in advance including a charge-history-dependent charge pattern to determine the charge current based on charge history information regarding a charge history of the electrically-powered vehicle;
a selection result storing portion configured to store a result of the selection;
a history information storing portion configured to store the charge history information of the electrically-powered vehicles connected to the charging ports; and
a controller configured to refer to the selection result storing portion, control the charging portion in accordance with a selected charge pattern,
the controller configured to determine priorities of the electrically-powered vehicles based on the charge history information when the charge-history-dependent charge pattern is selected and two or more electrically-powered vehicles are connected to the charging ports,
when the charge-history-dependent charge pattern is selected and two or more electrically-powered vehicles are connected to the charging ports, the controller determines whether or not a behavior pattern of each of the electrically-powered vehicles is usual based on the charge history information and determines to lower a priority of the electrically-powered vehicle whose behavior pattern has been determined as usual with respect to the other electrically-powered vehicle, wherein
the charge history information includes connection-time information regarding time of connection to the charging port, SOC information regarding a state-of-charge (SOC) at the time of connection to the charging port, and connection release time information regarding time of connection releasing from the charging port,
the charge history information is expressed as average of a plurality of charge histories,
at least one of the charge patterns is a charge-history-independent charge pattern to determine the charge current irrelevantly to a charge history of the electrically-powered vehicle, and,
when the charge-history-independent charge pattern is selected and two or more electrically-powered vehicles are connected to the charging ports, the controller classifies the electrically-powered vehicles into a plurality of groups based on current SOCs of the electrically-powered vehicles and determines the charge current for each group so that an electrically-powered vehicle with a low SOC is charged on a priority basis.

6. A charging apparatus for an electrically-powered vehicle, comprising:
a plurality of charging ports;
a charging portion configured to output charge current to the charging ports;
an input portion configured to receive selection of a charge pattern by a user among a plurality of charge patterns prepared in advance including a charge-history-dependent charge pattern to determine the charge current based on charge history information regarding a charge history of the electrically-powered vehicle;
a selection result storing portion configured to store a result of the selection;
a history information storing portion configured to store the charge history information of electrically-powered vehicles connected to the charging ports; and
a controller configured to refer to the selection result storing portion and control the charging portion in accordance with a selected charge pattern,
the controller configured to determine priorities of the electrically-powered vehicles based on the charge history information when the charge-history-dependent charge pattern is selected and the two or more electrically-powered vehicles are connected to the charging ports, wherein the charge history information includes connection-time information regarding a time of connection to the charging ports, and SOC information regarding a state-of-charge (SOC) at the time of connection to the charging ports, and
the controller is configured to determine to lower the priority of the electrically-powered vehicle that meets determining conditions (i) and (ii), when the charge-history-dependent charge pattern is selected and the two or more electrically-powered vehicles are connected to the charging ports, the determining condition (i) being that the difference between a current connection time and a past connection time is within a predetermined range, the determining condition (ii) being that the difference between a current connection-time SOC and a past connection-time SOC is within a predetermined range.

7. The charging apparatus according to claim 6, wherein the charge history information further includes connection release time information regarding a time of connection releasing from the charging ports, and
the controller determines to lower the priority of the electrically-powered vehicle that meets determining conditions (i), (ii) and (iii), the determining condition (iii) being that a time period from a current time to a past connection release time is expected to be adequate.

8. The charging apparatus according to claim 7, wherein the determining condition (iii) is determined by comparison between a time obtained by subtracting an allowable time period and a time at which charging to the other electrically-powered vehicle is to be completed.

9. The charging apparatus according to claim 6, wherein the connection-time information is an average of a plurality of past connection times, and the SOC information is an average of a plurality of past connection-time SOCs.

10. The charging apparatus according to claim 7, wherein the past connection release time is an average of a plurality of past connection release times.

11. The charging apparatus according to claim 6, wherein at least one of the charge patterns is a charge-history-independent charge pattern to determine the charge current irrelevantly to a charge history of the electrically-powered vehicle.

12. The charging apparatus according to claim 11, wherein, when the charge-history-independent charge pattern is selected and the two or more electrically-powered vehicles are connected to the charging ports, the controller classifies the electrically-powered vehicles into a plurality of groups based on current SOCs of the electrically-powered vehicles and determines the charge current for each group so that an electrically-powered vehicle with a low SOC is charged on a priority basis.

13. The charging apparatus according to claim 1, wherein the controller lowers a priority for charging of a vehicle based on a current connection time of the vehicle, a past connection time average of the vehicle, a current connection-time SOC of the vehicle, and a past connection-time SOC of the vehicle.

* * * * *